(12) United States Patent
Mountz et al.

(10) Patent No.: US 8,700,502 B2
(45) Date of Patent: Apr. 15, 2014

(54) SYSTEM AND METHOD FOR FILLING AN ORDER

(75) Inventors: Michael C. Mountz, Cambridge, MA (US); Peter R. Wurman, Raleigh, NC (US)

(73) Assignee: Amazon Technologies, Inc., Reno, NV (US)

(*) Notice: Subject to any disclaimer, the term of this patent is extended or adjusted under 35 U.S.C. 154(b) by 0 days.

(21) Appl. No.: 13/596,232

(22) Filed: Aug. 28, 2012

(65) Prior Publication Data

US 2012/0323746 A1    Dec. 20, 2012

Related U.S. Application Data

(63) Continuation of application No. 11/620,464, filed on Jan. 5, 2007, now Pat. No. 8,311,902.

(51) Int. Cl.
| | |
|---|---|
| *G06Q 10/00* | (2012.01) |
| *G06F 7/00* | (2006.01) |
| *G06Q 10/08* | (2012.01) |
| *G06F 17/00* | (2006.01) |

(52) U.S. Cl.
CPC .............. *G06Q 10/087* (2013.01); *G06Q 10/08* (2013.01); *G06F 17/00* (2013.01)
USPC ............................. 705/28; 700/213; 700/226

(58) Field of Classification Search
CPC ....... G06Q 10/087; G06Q 10/08; G06F 17/00
USPC ..................................... 705/28; 700/213, 226
See application file for complete search history.

(56) References Cited

U.S. PATENT DOCUMENTS

| | | |
|---|---|---|
| 4,093,086 A | 6/1978 | Lucas et al. |
| 4,678,390 A | 7/1987 | Bonneton et al. |
| 5,228,820 A | 7/1993 | Stansfield et al. |
| 5,434,490 A | 7/1995 | Ishida et al. |
| 5,636,966 A | 6/1997 | Lyon et al. |
| 5,720,157 A | 2/1998 | Ross |
| 5,733,098 A | 3/1998 | Lyon et al. |
| 6,011,998 A | 1/2000 | Lichti et al. |

(Continued)

FOREIGN PATENT DOCUMENTS

| | | | |
|---|---|---|---|
| JP | 05-124711 | | 5/1993 |
| JP | 411116012 A | * | 4/1999 |

(Continued)

OTHER PUBLICATIONS

Auguston, Karen A., "AGV upgrade eliminates downtime and more," Modern Materials Handling, 51(3), 36. Retrieved May 9, 2012, from ABI/INFORM Global. (Document ID: 9370528), Mar. 1996.

(Continued)

*Primary Examiner* — Scott Zare
(74) *Attorney, Agent, or Firm* — Baker Botts L.L.P.

(57) ABSTRACT

A method for fulfilling inventory requests includes receiving an inventory request requesting an inventory item and selecting the requested inventory item from an inventory holder. The method further includes storing the requested inventory item in an order holder associated with the inventory request and moving the order holder to a storage space. In addition, the method includes detecting a triggering event and in response to detecting the triggering event, retrieving the order holder from the storage space.

17 Claims, 4 Drawing Sheets

(56) References Cited

U.S. PATENT DOCUMENTS

| | | | |
|---|---|---|---|
| 6,061,607 | A | 5/2000 | Bradley et al. |
| 6,208,908 | B1 | 3/2001 | Boyd et al. |
| 6,505,093 | B1 | 1/2003 | Thatcher et al. |
| 6,602,037 | B2 | 8/2003 | Winkler |
| 6,622,127 | B1 | 9/2003 | Klots et al. |
| 7,139,637 | B1 | 11/2006 | Waddington et al. |
| 7,305,287 | B2 * | 12/2007 | Park ................. 701/23 |
| 7,504,949 | B1 | 3/2009 | Rouaix et al. |
| 7,516,848 | B1 | 4/2009 | Shakes et al. |
| 7,591,630 | B2 | 9/2009 | Lert, Jr. |
| 2003/0110102 | A1 | 6/2003 | Chien et al. |
| 2003/0149644 | A1 | 8/2003 | Stingel, III et al. |
| 2005/0102203 | A1 | 5/2005 | Keong |
| 2005/0159838 | A1 | 7/2005 | Quackenbush et al. |
| 2005/0238467 | A1 | 10/2005 | Minges |
| 2006/0142895 | A1 | 6/2006 | Waddington et al. |
| 2006/0206235 | A1 | 9/2006 | Shakes et al. |
| 2006/0206246 | A1 | 9/2006 | Walker |
| 2007/0150383 | A1 | 6/2007 | Shakes et al. |
| 2007/0237610 | A1 | 10/2007 | Uribe |
| 2008/0008568 | A1 | 1/2008 | Harris et al. |
| 2008/0141895 | A1 * | 6/2008 | Lanigan et al. ........ 104/29 |
| 2009/0074545 | A1 | 3/2009 | Lert et al. |
| 2009/0222129 | A1 | 9/2009 | Waddington et al. |
| 2009/0224923 | A1 | 9/2009 | Abraham et al. |

FOREIGN PATENT DOCUMENTS

| | | |
|---|---|---|
| JP | 2002-104608 | 4/2002 |
| JP | 2003-206009 | 7/2003 |
| JP | 2006-518322 | 8/2006 |

OTHER PUBLICATIONS

PCT Notification of Transmittal of the International Search Report and the Written Opinion of the International Searching Authority, or the Declaration with attached PCT International Search Report and PCT Written Opinion of the International Searching Authority in International Application No. PCT/US07/087057, dated Oct. 1, 2008, 9 pages.

Japanese Appln. No. 2009-544868, Notification of Reasons for Rejection mailed Mar. 21, 2012 (includes translation), Mar. 21, 2012.

Office Action, European Patent Office, Application No. PCT/US2007/087057; Oct. 24, 2011.

Canadian Intellectual Property Office; Canadian Office Action, Application No. 2674241, 3 pages, May 1, 2012.

* cited by examiner

SYSTEM AND METHOD FOR FILLING AN ORDER

RELATED APPLICATIONS

This application is a continuation of U.S. application Ser. No. 11/620,464 filed Jan. 5, 2007, entitled, "System and Method for Filling an Order."

TECHNICAL FIELD OF THE INVENTION

This invention relates in general to material handling systems and, more particularly, to a method and system for fulfilling orders in a material handling system.

BACKGROUND OF THE INVENTION

Modern inventory systems, such as those in mail-order warehouses, airport luggage systems, and custom-order manufacturing facilities, face significant challenges in responding to orders or requests for inventory items. In inventory systems tasked with responding to large numbers of diverse inventory requests, slow responses to inventory requests may result in an ever-increasing backlog of requests. Delays produced by such backlogs can result in lost business, wasted manpower, and other forms of economic loss.

Automation may reduce the amount of time it takes to identify and select requested items and to package orders. Nonetheless, the shipment of completed orders may depend on occasional or periodic events with no scheduling flexibility. For example, the shipment of a particular group of orders may be delayed until a delivery truck responsible for delivering that group of orders arrives at the facility. Once the delivery truck arrives, shipment may be further delayed as orders designated for a particular destination or carrier are identified and collected for shipping. As a result, the backlog in packed orders may overrun the packing area, prevent work on other orders from proceeding and, in general, reduce the throughput of the facility.

SUMMARY OF THE INVENTION

In accordance with the present invention, the disadvantages and problems associated with fulfilling orders within, for example, an inventory storage system have been substantially reduced or eliminated. In particular, a method and system for fulfilling orders is provided that provides increased efficiency and throughput.

In accordance with one embodiment of the present invention, a method for fulfilling inventory requests includes receiving an inventory request requesting an inventory item and selecting the requested inventory item from an inventory holder. The method further includes storing the requested inventory item in an order holder associated with the inventory request and moving the order holder to a storage space. In addition, the method includes detecting a triggering event and in response to detecting the triggering event, retrieving the order holder from the storage space.

In accordance with another embodiment of the present invention, a system for fulfilling inventory requests includes a plurality of inventory holders, an order holder, a plurality of mobile drive units, and a management module. The plurality of inventory holders store inventory items, while the order holder stores orders. Each order includes one or more inventory items and is associated with a particular inventory request. The mobile drive units move the inventory holders and order holder within a workspace.

Additionally, the management module is capable of receiving an inventory request requesting an inventory item and instructing a first mobile drive unit to move an inventory holder storing the requested inventory item to a first location. The management module is also capable of instructing a second mobile drive unit to move the order holder to the first location and instructing the second mobile drive unit to move the order holder to a storage space within the workspace after the requested inventory item has been transferred from the inventory holder to the order holder. Additionally, the management module is capable of detecting a triggering event and, in response to detecting the triggering event, instructing the mobile drive unit to retrieve the order holder from the storage space.

Technical advantages of certain embodiments of the present invention include faster order fulfillment and more efficient use of storage space, workspace pathways, processing equipment, delivery resources, and other system assets in storing, processing, and shipping packed orders. Additional technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
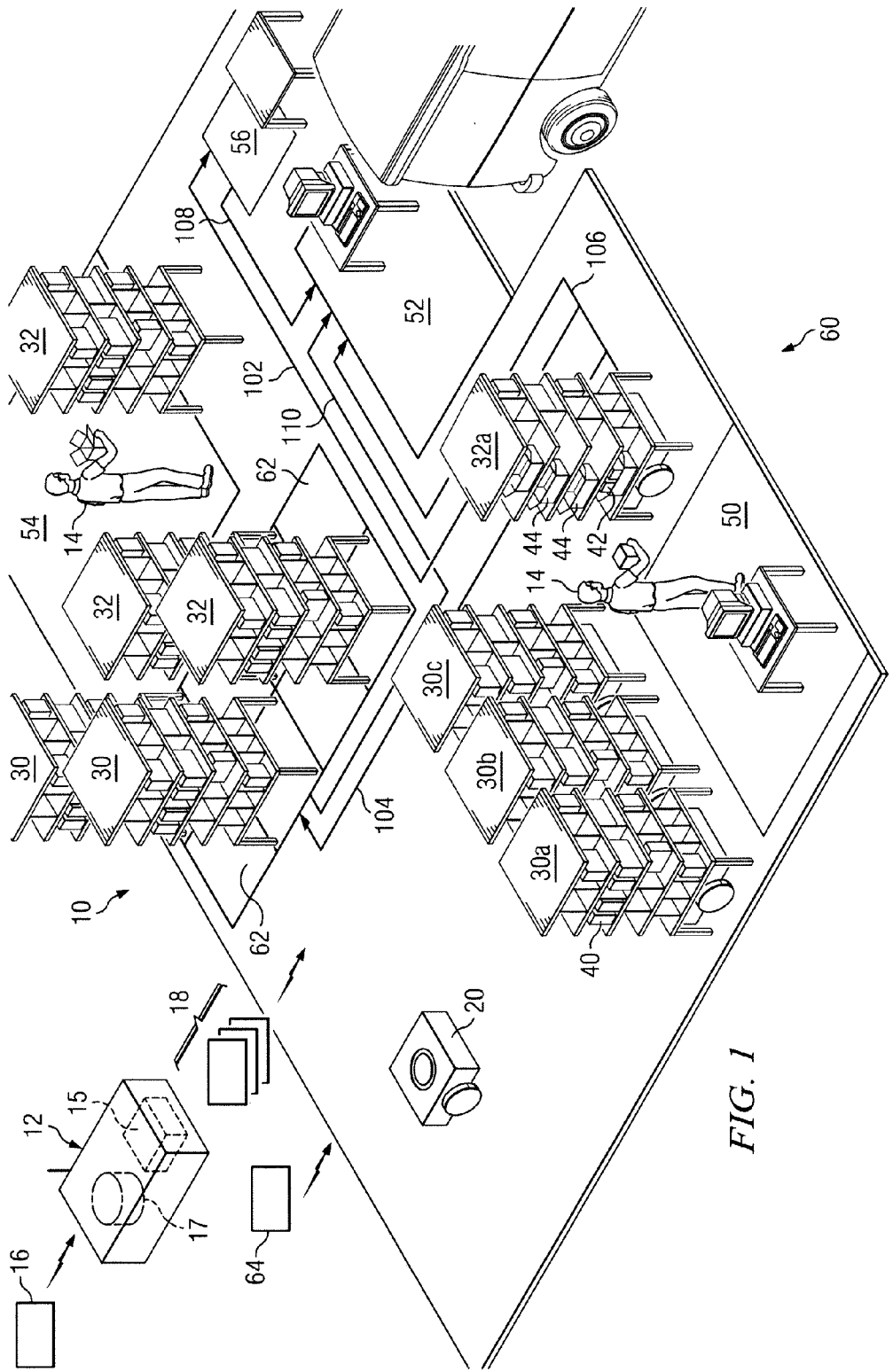
FIG. 1 illustrates an inventory handling system.

FIG. 1 illustrates a particular embodiment of an inventory system 10 that stores and retrieves inventory items 40 for purposes of satisfying inventory requests 16 received or generated by inventory system 10. The embodiment of inventory system 10 illustrated in FIG. 1 includes a management module 12, a user 14, a plurality of mobile drive units 20, a plurality of inventory holders 30, a plurality of order holders 32, an inventory station 50, a shipping station 52, an induction station 54, and a processing station 56. These elements interoperate within a workspace 60 of inventory system 10 to complete various tasks related to fulfilling inventory requests received by inventory system 10. By managing the creation, storage, and retrieval of orders 42 that satisfy these requests, particular embodiments of inventory system 10 can provide improved request fulfillment.

Management module 12 assigns tasks to appropriate components of inventory system 10 and coordinates operation of the various components in completing the tasks. These tasks may relate to the movement and processing of inventory items 40, the creation of orders 42, and the maintenance of the components of inventory system 10. Management module 12 may select particular components of inventory system 10 to perform these tasks and communicate appropriate commands and/or data to the selected components to facilitate completion of these operations. Although shown in FIG. 1 as a single, discrete component, management module 12 may represent multiple components. For example, management module 12 may represent or include portions of mobile drive units 20 or other elements of inventory system 10. As a result, any or all of the interaction between management module 12 and a particular mobile drive unit 20, inventory station 50, or other component that is described below may, in particular embodiments, represent peer-to-peer communication between that component and other similar components in inventory system 10.

Management module 12 may include any appropriate combination of software and/or hardware suitable to provide the described functionality. In particular embodiments, management module 12 includes a processor 15 and a memory 17. Memory 17 may store processor instructions and other information used by management module 12 during operation, and processor 15 executes the processor instructions to provide the described functionality, in part or in its entirety.

User 14 represents, in particular embodiments, a human operator of inventory system 10 or an operator of particular elements of inventory system 10, such as inventory station 50, shipping station 52, or induction station 54. User 14 performs tasks involving inventory items 40 such as picking inventory items 40 stored in inventory system 10 and replenishing inventory items 40 in inventory system 10. Although the description below focuses on embodiments of inventory system 10 in which user 14 represents a human, user 14 may represent a robot or other automated components capable of completing tasks involving inventory items 40.

Mobile drive units 20 move inventory holders 30 and order holders 32 between locations within workspace 60. Mobile drive units 20 may represent any devices or components appropriate for use in inventory system 10 based on the characteristics and configuration of holders 30 and 32 and/or other elements of inventory system 10. In a particular embodiment of inventory system 10, mobile drive units 20 represent independent, self-powered devices configured to freely move about a workspace of inventory system 10. In alternative embodiments, mobile drive units 20 represent elements of a tracked inventory system configured to move holders 30 and 32 along tracks, rails, cables, crane system, or other guidance or support elements traversing workspace 60.

While various embodiments of mobile drive unit 20 may be configured to interact with and move inventory holders 30 in any appropriate manner, mobile drive units 20, in particular embodiments, are configured to move inventory holders 30 and/or order holders 32 by positioning themselves beneath a particular holder 30 or 32 and docking with the holder 30 or 32. As a result of docking with a particular holder 30 or 32, a mobile drive unit 20 may couple to and/or support the holder 30 or 32. After docking the relevant mobile drive unit 20 can then move, rotate, and/or otherwise maneuver the docked holder 30 or 32.

Mobile drive units 20 may be also capable of communicating with management module 12 to receive information identifying selected holders 30 and 32, transmit the locations of mobile drive units 20, or exchange any other suitable information to be used by management module 12 or mobile drive units 20 during operation. Mobile drive units 20 may communicate with management module 12 wirelessly, using wired connections between mobile drive units 20 and management module 12, and/or in any other appropriate manner. In general, mobile drive units 20 may be powered, propelled, and controlled in any manner appropriate based on the configuration and characteristics of inventory system 10.

Inventory holders 30 store inventory items 40. In a particular embodiment, inventory holders 30 include multiple storage bins with each storage bin capable of holding a different type of inventory item 40. Inventory holders 30 may include suitable components to allow inventory holders 30 to dock with and/or couple to mobile drive units 20 and are capable of being carried, rolled or otherwise moved by mobile drive units 20. In particular embodiments, inventory holder 30 may provide additional propulsion to supplement that provided by mobile drive unit 20 when moving inventory holder 30. Additionally, each inventory holder 30 may include a plurality of faces, and each bin may be accessible through one or more faces of the inventory holder 30. Mobile drive unit 20 may be configured to rotate inventory holders 30 at appropriate times to present a particular face and the bins associated with that face to an operator or other components of inventory system 10.

Inventory items 40 represent any objects suitable for storage, retrieval, and/or processing in an automated inventory system 10. As one example, inventory system 10 may represent a mail-order or warehouse facility, and inventory items 40 may represent merchandise stored in the facility. As another example, inventory system 10 may represent a merchandise-return facility, and inventory items 40 may represent merchandise returned by customers. As yet another example, inventory system 10 may represent a manufacturing facility, and inventory items 40 may represent individual components of a manufacturing kit to be assembled into a finished product, such as electronic components for a customized computer system.

Order holders 32 store orders 42 and, in particular embodiments, shipping containers 44. Order holders 32 may include suitable components to allow order holders 32 to dock with and/or couple to mobile drive units 20 and are capable of being carried, rolled, and/or otherwise moved by mobile drive units 20. In particular embodiments, order holders 32 may provide additional propulsion to supplement that provided by mobile drive units 20 when moving order holders 32. In particular embodiments, order holders 32 and inventory holders 30 may represent similar or identical components. Moreover, in particular embodiments, a particular component may, at different times, serve as both an inventory holder 30 and an order holder 32. Furthermore, in certain embodiments, a component may even serve simultaneously as both an inventory holder 30 and an order holder 32 by storing both inventory items 40 and orders 42.

Order holders 32 may include multiple storage bins with each storage bin capable of holding a different order 42. Additionally, order holders 32 may be stocked with shipping containers 44 that are each capable of storing, holding, and/or enclosing an order 42 during shipment to a destination. These shipping containers 44 may represent boxes, pallets, or other shipping containers in which orders can be delivered to their destination. Alternatively, order holder 32 may include no bins or partitions and may instead hold only a single order 42 or a group of orders 42 that are stored en masse. For example, order holder 32 may support, include, or represent a pallet on which one or more orders 42 are stored. Moreover, in particular embodiments, this pallet may itself represent a shipping container 44 on or in which the stored orders 42 may be shipped.

Orders 42 each represent a collection of one or more inventory items 40 that has been created in response to an inventory request 16. In particular embodiments, orders 42 include inventory items 40 selected from various inventory holders 30 by a user 14 based on information included in inventory requests 16. As described further below, after creating an order 42, user 14 may place the inventory items 40 of the created order 42 in a particular bin of an order holder 32 or a particular shipping container 44 held by an order holder 32. At an appropriate time, orders 42 may then be shipped to a designated destination identified by the corresponding inventory request 16 or a destination that is otherwise associated with the relevant order 42.

Inventory stations 50 represent locations designated for the completion of particular tasks involving inventory items 40. Such tasks may include the removal of inventory items 40 from and the storage of inventory items 40 in inventory holders 30, the transfer of inventory items 40 from inventory holder 30 to order holder 32, the counting of inventory items 40 on inventory holders 30, and/or the processing or handling of inventory items 40 in any other suitable manner. For example, in the illustrated example, a user 14 located at inventory station 50 is responsible for selecting inventory items 40 from inventory holders 30 to create orders 42 that user 14 then stores in order holders 32. Although FIG. 1 includes only a single inventory station 50, individual embodiments of inventory system 10 may include any appropriate number of inventory stations 50. Additionally, in particular embodiments, some or all orders 42 created by inventory system 10 may be created through steps performed by users 14 at multiple different inventory stations 50. For example, a particular order 42 may be created by a first user 14 storing one or more requested inventory items 40 in an associated order holder 32 at a first inventory station 50 and then, after the associated order holder 32 is transported to a second inventory station 50, a second user 14 storing one or more additional inventory items 40 in the associated order holder 32 at the second inventory station 50.

Shipping stations 52 represent locations where orders 42 may be shipped to a destination or otherwise removed from inventory system 10. If orders 42 are not stored in shipping containers 44 when placed in order holders 32, orders 42 may be packed in shipping containers 44 at shipping stations 52. In particular embodiments, shipping stations 52 represent or are located at loading docks, cargo bays, or other areas where delivery trucks or other transportation vehicles can enter or approach inventory system 10 and orders 42 can be loaded on the transportation vehicles. In alternative embodiments, shipping stations 52 may represent reception areas where a user 14 can turn over packed orders 42 to delivery personnel of a shipping service.

Induction stations 54 represent locations where new or emptied order holders 32 may be prepared for use in inventory system 10. In particular embodiments, an order holder 32 may, at induction stations 54, be stocked with shipping containers 44 in which the orders 42 stored by that order holder 32 are to be placed. Additionally, induction stations 54 may communicate information identifying the relevant order holder 32 and/or the shipping containers 44 held by that order holder 32 to management module 12. Management module 12 may use this identification to track the location and/or status of the relevant order holder 32 and its associated orders 42. In particular embodiments, order holders 32 may be prepared at the same location as orders 42 are created and, thus, induction station 54 may represent or be co-located with inventory station 50. The process of preparing order holders 32 for use in inventory system 10 is discussed in greater detail below with respect to FIG. 3.

Processing stations 56 represent locations where certain value-added tasks can be performed on orders 42 that have been created, or partially created, before those orders 42 are shipped to a destination or otherwise removed from inventory system 10. Any appropriate tasks may be performed to orders 42 at processing stations 56. The tasks performed at processing stations 56 in particular embodiments of inventory system 10 may include, but are not limited to, order inspection, product assembly, packaging, logging, quality control, and/or any other suitable aspect of fulfilling the current order 42.

In particular embodiments, inventory stations 50, shipping stations 52, and induction stations 54 may represent just the physical locations where a particular task can be completed within workspace 60. In alternative embodiments, inventory stations 50 may represent both the physical location as well as any appropriate equipment for performing the relevant task. Such equipment may include, in particular embodiments, computers for maintaining data associated with the relevant task, scanners for monitoring the flow of inventory items 40 or holders 30 or 32 in and out of inventory system 10, communication interfaces for communicating with management module 12, and/or any other suitable equipment for performing tasks related to inventory items 40 or orders 42. Although FIG. 1 illustrates a particular embodiment of inventory system 10 containing a particular number and configuration of inventory stations 50, shipping stations 52, induction stations 54, and processing stations 56, alternative embodiments may include any appropriate number of each of these stations.

In operation, users 14 and various components of inventory system 10 complete tasks involving the fulfillment of inventory requests 16 received or generated by inventory system 10. For purposes of this description and the claims that follow, management module 12 may receive an inventory request by receiving the inventory request 16 from another component, by accessing a memory to retrieve the inventory request 16, or by utilizing a processor of management module 12 to itself generate the inventory request 16. Furthermore, inventory requests 16 may identify or indicate inventory items 40 to be shipped to another location. As one example, in a mail-order system, inventory requests 16 may represent electronic orders submitted by customers or retail vendors via the Internet. As another example, in a warehouse system, inventory requests 16 may represent lists of inventory items 40 generated by management module 12 itself to facilitate scheduled delivery of a particular assortment of inventory items 40 to a retail vendor. More generally, however, inventory request 16 may represent any appropriate information identifying particular inventory items 40 and/or initiating the collection and/or shipment of particular inventory items 40.

In response to the inventory requests 16, management module 12 may select the appropriate components to complete particular tasks related to the inventory request 16 and transmit one or more task assignments 18 to the selected components to trigger completion of the relevant tasks. Each task assignment 18 defines, describes, and/or identifies one or more tasks to be completed by a particular component. These tasks may relate to the retrieval, storage, packing, and shipping of inventory items 40 and/or the management of components of inventory system 10. Although task assignments 18 may represent any appropriate information communicated to the relevant component in any suitable manner, in particular embodiments, task assignments 18 each comprise one or more packets transmitted to the relevant components in accordance with the 802.11, 802.15.4, or Bluetooth wireless communication standards. The task assignments 18 transmitted by management module 12 to the various components of inventory system 10 may represent different types of signals, messages, instructions, and/or data depending on the configuration and capabilities of the relevant components.

In particular, management module 12 may generate task assignments 18 to facilitate the creation, packing, and pre-shipment processing of an order 42 requested by the relevant inventory request 16. For example, to create an order 42 satisfying the inventory request 16, management module 12 may identify one or more inventory holders 30 currently storing inventory items 40 requested by the inventory request 16 (inventory holders 30a-c in the illustrated example). Management module 12 may then generate one or more task assignments 18 specifying the location of these inventory holders 30 and then transmit the generated task assignments 18 to appropriate components of inventory system 10, such as selected mobile drive units 20, to request the transport of these inventory holders 30 to inventory station 50. As a result, a selected set of mobile drive units 20 may move to the inventory holders 30 storing the requested inventory items 40 and dock with these inventory holders 30. The selected set of mobile drive units 20 may then move the relevant inventory holders 30 to inventory station 50 as shown in FIG. 1.

In addition, management module 12 may select an order holder 32 in which to store the inventory items 40 associated with the order 42 currently being created (referred to here as the "current order"). Management module 12 may select the order holder 32 based on any appropriate criteria, factors, or considerations. As one example, management module 12 may select an order holder 32 for the current order 42 based on the inventory items 40 included in the current order 42. More specifically, management module 12 may select an order holder 32 on which to store the current order 42 based on the fact that the selected order holder 32 includes one or more other orders 42 that will be filled from some or all of the same inventory holders 30. This may allow one or more of the selected inventory holders 30 to be used in filling multiple orders 42 to be stored on the selected order holder 32 and may reduce the time and system resources expended in filling the relevant orders 42.

As another example, management module 12 may select an order holder 32 based on the tasks to be completed with respect to the current order 42 before that order 42 is shipped or otherwise removed from inventory system 10. These tasks may relate to order inspection, product assembly, packaging, logging, quality control, and/or any other suitable aspect of fulfilling the current order 42. For example, in a mail-order system, if the current order 42 includes a fragile item that requires the current order 42 to be packaged with bubble wrap or other packaging materials, management module 12 may select an order holder 32 on which other orders 42 requiring the same or related packaging are or will be stored. In a luggage processing system, management module 12 may select an order holder 32 based on the type of inspection (e.g., manual inspection, x-ray) the luggage items in the current order 42 are to undergo.

As yet another example, management module 12 may select order holder 32 based on a destination, truck route, shipping carrier, shipping class, retrieval time, and/or other consideration associated with the shipping or removal of order 42 from inventory system 10. For example, in an inventory warehouse system, management module 12 may select an order holder 32 on which other orders 42 destined for a particular retail outlet are or will be stored. In a mail order system, when filling an order 42 for a particular class of delivery (e.g., overnight delivery) or for delivery by a particular shipping service, management module 12 may select an order holder 32 that is or will be storing other orders 42 that will be shipped using the same class of delivery or shipping service.

As yet another example, management module 12 may select order holder 32 based on the size of the shipping container 44 that will be used to hold the current order 42. This may allow management module 12 to assign the current order 42 to a particular order holder 32 specially configured to hold shipping containers 44 of that size or to an order holder 32 having open bins of the appropriate size for the relevant shipping container 44. Additionally, by selecting an order holder 32 based on the size of the shipping container 44 in which the current order 42 will be shipped, management module 12 may also be able to evenly distribute the weight and space of orders 42 between the various order holders 32.

After selecting an appropriate order holder 32 for the current order 42, management module 12 may generate one or more task assignments 18 identifying the selected order holder 32 (order holder 32a in the illustrated example) or its current location. Management module 12 then transmits the generated task assignments 18 to appropriate components of inventory system 10, such as a selected mobile drive unit 20, to request the transport of order holder 32a to inventory station 50. As a result, a particular mobile drive unit 20 may move to order holder 32a and dock with order holder 32a. The relevant mobile drive unit 20 may then move order holder 32a to inventory station 50 as shown in FIG. 1.

Once the appropriate inventory holders 30 and order holder 32 are located at inventory station 50, user 14 may then begin a number of tasks related to the creation of an order 42 fulfilling inventory request 16. Depending on the contents of inventory request 16, management module 12 may generate a task assignment 18 for user 14 and/or inventory station 50 that identifies inventory items 40 to be selected for the current order 42 and/or bins on particular inventory holders 30 that store these inventory items 40. Management module 12 may then transmit these task assignments 18 to user 14 and/or inventory station 50 to guide user 14 in packing the associated order 42. Alternatively or additionally, inventory system 10 may, in particular embodiments, include a plurality of status indicators, each associated with a particular storage bin of one of inventory holders 30, and management module 12 may transmit task assignments 18 to these status indicators for purposes of guiding user 14 through the packing of the current order 42.

Once management module 12 transmits task assignments 18 to the appropriate components, user 14 may begin packing the current order 42. As part of packing the current order 42, user 14 selects one or more inventory items 40 from appropriate inventory holders 30a-c and transfers the selected inventory items 40 to order holder 32a. For example, management module 12 may indicate to user 14 through task assignments 18, status indicators of inventory holders 30a-c, or other elements of inventory system 10 various components of inventory station 50 (e.g., laser pointers, computer generated audio prompts) appropriate inventory items 40 to select for the current order 42. User 14 then transports an appropriate number of units of the indicated inventory items 40 from their respective inventory holders 30 to order holder 32a.

As noted above, order holder 32a may include a number of bins, each intended to hold the inventory items 40 of a particular order 42. Additionally, order holder 32a may be stocked with one or more shipping containers 44. As a result, user 14 may store inventory items 40 for the order 42 in a particular holder bin or shipping container 44 designated for the current order 42. For example, as described in greater detail below with respect to FIG. 3, empty shipping containers 44 may be placed in order holders 32 when order holders 32 are put into commission in inventory system 10 or at any other appropriate time during operation. These shipping containers 44 may then be associated with inventory requests 16 as inventory requests 16 are received by inventory system 10, and user 14 may place inventory items 40 of the order 42 fulfilling a given inventory request 16 in the shipping container 44 associated with that inventory request 16.

In particular embodiments, task assignments 18 generated by management module 12 may also specify an order or sequence for the requested inventory items 40 to be added to the current order 42. As a result, a user 14 may create an order 42 that satisfies certain weight, size, and/or balance guidelines. For example, in particular embodiments, order holders 32 may include or represent pallets and the task assignments 18 associated with the current order 42 may indicate an order in which the requested inventory items 40 should be added to the pallet. User 14 may, for example, be instructed to load inventory items 40 onto the pallet such that heavier inventory items 40 are loaded first and, thus, placed on the bottom layer of the pallet. User 14 may then be instructed to load lighter inventory items 40 as a layer on top of the heavier inventory items 40. The resulting pallet formed by user 14 as part of creating the current order 42 may therefore be better balanced and less likely to overturn during transport within inventory system 10 or during shipping.

Furthermore, by specifying an order or sequence according to which the requested inventory items 40 will be added to the pallet, management module 12 may facilitate the creation of pallets in a manner that will ease unpacking of the pallet at its destination. As a result, the task assignments 18 generated by management module 12 may specify an order or sequence based on an anticipated or desired unpacking order for the inventory items 40 in the current order 42. For example, in particular embodiments, management module 12 may generate task assignments 18 that specify an order for loading a pallet that duplicates a store or aisle layout at a retail store. As a result, when the pallet reaches its destination, the pallet can be easily unpacked without having to reorder the inventory items 40 on the pallet.

Once user 14 has selected and moved the inventory items 40 identified by the received inventory request 16 to order holder 32a, inventory system 10 may transport order holder 32a (and any orders 42 stored on that order holder 32) to a processing station 56, a shipping station 52, or a storage space 62 within workspace 60 where orders 42 can be stored until processed or shipped. In particular embodiments, order holder 32a may, if appropriate, remain at inventory station 50 to be loaded with other orders 42 suitable for storage on order holder 32a. After user 14 loads any additional orders 42 onto the selected order holder 32a, inventory system 10 may then transport the order holder 32a as described.

To facilitate transportation of order holder 32a after the current order 42 has been stored in order holder 32a, management module 12 may generate one or more additional task assignments 18 identifying a next destination for order holder 32a and transmit this task assignment 18 to an appropriate mobile drive unit 20. The relevant mobile drive unit 20 may then move order holder 32a to this next destination. At this next destination, order holder 32a and/or the orders 42 in order holder 32a may be stored, processed, or shipped. Depending on the circumstances and/or the configuration of inventory system 10, mobile drive unit 20 may undock from order holder 32a at this next destination and leave the selected order holder 32a there for processing or storage. Alternatively, mobile drive unit 20 may wait at this next destination while order holder 32a is stored or processed and then, at an appropriate time, transport order holder 32a to one or more additional destinations.

As one example, in particular embodiments, mobile drive unit 20 may transport order holder 32a to a processing station 56 where certain tasks may be performed to one or more of the orders 42 held by order holder 32a. While at the processing station 56, a user 14 or automated components of inventory system 10 may perform tasks relating to order inspection, product assembly, packaging, logging, quality control, and/or any other suitable aspect of fulfilling the current order 42. As a result, in such embodiments, management module 12 may generate a task assignment 18 specifying the location of the processing station 56 and transmit this task assignment 18 to an appropriate mobile drive unit 20 that will move order holder 32a to the processing station 56. The relevant mobile drive unit 20 will then move order holder 32a to the processing station 56 (as suggested by arrow 102 in FIG. 1).

As another example, in particular embodiments, management module 12 may select a storage space 62 in which order holder 32a will be stored until additional actions can be taken with respect to the orders 42 stored in order holder 32a. As a result, in such embodiments, management module 12 may generate a task assignment 18 specifying the location of the selected storage space 62 and transmit the task assignment 18 to a mobile drive unit 20. The relevant mobile drive unit 20 will then move order holder 32a to the selected storage space 62 (as suggested by arrow 104 in FIG. 1). Management module 12 may select the storage space 62 based on any suitable criteria, factors, or considerations.

For example, management module 12 may select a storage space 62 for order holder 32a based on the fact that order holder 32a holds orders 42 ready to be shipped by inventory system 10. As a result, management module 12 may select a storage space 62 for such an order holder 32 that is near to shipping station 52 (such as a loading dock or other area of inventory system 10 associated with shipping orders 42). Furthermore, management module 12 may select storage space 62 for order holder 32a based on a shipping time or date for one or more orders 42 stored on order holder 32a. This may allow management module 12 to arrange storage spaces 62 for order holders 32 in an intelligent manner that recognizes the sequence in which their respective orders 42 will be shipped. For example, order holders 32 storing orders 42 that are due to be shipped out of inventory system 10 in the distant future may be stored behind order holders 32 storing orders 42 that are due to be shipped out sooner.

Inventory system 10 may then store order holder 32a in the selected storage space until additional actions can be taken with respect to the orders 42 stored in order holder 32a. In particular embodiments, order holder 32a may be stored in a storage space 62 until the arrival of a delivery truck or other transportation vehicle that, based on the delivery destination, class of service, and/or other properties of the vehicle or the service it provides, is suitable for delivery of one or more of the orders 42 on the order holder 32. For example, inventory system 10 may fill a particular order holder 32 with orders 42 destined for the same destination and then store that order holder 32 in a storage space 62 until a delivery truck traveling to that destination arrives or is ready for loading. Similarly, inventory system 10 may fill an order holder 32 with orders 42 for shipping by a particular shipping service and then store that order holder 32 in a storage space 62 until delivery personnel for that shipping service arrive to take possession of these orders 42. More generally, however, order holders 32 may be stored in storage spaces 62 until any appropriate event occurs or condition is satisfied.

Inventory system 10 may, at an appropriate time, move order holders 32 from inventory station 50 (as suggested by arrow 106 in FIG. 1), processing station 56 (as suggested by arrow 108), or storage spaces 62 (as suggested by arrow 110) to shipping station 52 to facilitate the shipping of orders 42. Orders 42 may then be selected from the relevant order holders 32 and shipped from inventory system 10 to a particular destination or otherwise removed from inventory system 10. In particular embodiments, appropriate components of inventory system 10 (such as management module 12) may detect the occurrence of a triggering event that induces management module 12 to initiate the shipping of particular orders 42 associated with the triggering event. For example, in particular embodiments, a component of inventory system 10 may detect the arrival of a delivery truck. In particular embodiments, a message may be transmitted to management module 12 identifying the delivery truck when delivery truck arrives at a loading dock associated with inventory system 10. Management module 12 may then instruct appropriate elements of inventory system 10 to initiate a shipping process for particular orders 42 to be delivered or transported by this delivery truck. More generally, however, the triggering event may represent any appropriate event indicating that shipping of a particular order can or should proceed.

Additionally, in particular embodiments, inventory system 10 may be configured to organize the transport of orders 42 to shipping station 52 in a manner that optimizes the shipment of the relevant orders 42. As a result, inventory system 10 may identify appropriate orders 42 and/or appropriate order holders 32 to transport to shipping station 52 based on any suitable considerations, such as the size of shipping containers utilized the relevant orders, the destination of these orders 42, and/or the inventory items 40 included in these orders 42. Moreover, the relevant considerations may differ from the considerations originally utilized to group the orders 42 in order holders 32. Thus, in particular embodiments, inventory system 10 may provide sufficient flexibility to allow management module 12 to organize and transport orders 40 in a manner such that inventory system 10 can dynamically respond to changing circumstances within inventory system 10. Furthermore, by sequencing the transport of orders 42 to shipping station 52, inventory system 10 may be able to ensure that, not only are the proper orders 42 moved to shipping station 52 at the appropriate times but that they are removed from inventory system (e.g., loaded on a delivery truck) in a particular order to simplify delivery and/or unloading.

To facilitate the transport of appropriate orders 40 to shipping station 52, management module 12 may generate task assignments 18 identifying the shipping station 52 or its location and transmit these task assignments 18 to an appropriate mobile drive unit 20. The selected mobile drive unit 20 may then move to the relevant order holder 32 and transport the relevant order holder 32 to the designated shipping station 52. Additionally, in particular embodiments, management module 12 may be able to generate and/or transmit task assignments 18 to the appropriate mobile drive units 20 in a manner that identifies an order or sequence in which the designated order holders 32 should be moved to shipping station 52 and/or an order or sequence in which order holders 32 should be positioned once they have been moved to shipping station 52. This order or sequence may be specified in the task assignments 18 or may be determined by order holders 32 (e.g., based on the order in which mobile drive units 20 receive task assignments).

At the shipping station 52, a user 14 may remove one or more orders 42 from the selected order holder 32 and initiate the shipment of these orders 42 to an intermediate or final destination or otherwise remove orders 42 from inventory system 10. For example, user 14 may select a particular group of one or more orders 42 that will be shipped to a particular destination and remove those orders 42 from the selected order holder 32. User 14 may then load these orders 42 onto a delivery truck or other form of transportation vehicle for delivery to that destination. Similarly, user 14 may select a particular group of one or more orders 42 that will be delivered by a particular delivery service and may hand these orders 42 over to delivery personnel for that delivery service for example, during an on-site delivery pickup. In general, user 14 may take any suitable steps to initiate the shipment of the selected orders 42 or to remove the selected orders 42 from inventory system 10.

Shipment of the selected orders 42 may, in particular embodiments, be completed by other parties or elements external to inventory system 10. Alternatively, in particular embodiments, inventory system 10 may include delivery trucks or other equipment suitable to facilitate delivery of orders 42 to a final destination. In such embodiments, inventory system 10 may be responsible, at least in part, for shipping the selected orders 42 to their final destination.

In addition, in particular embodiments, inventory system 10 may be configured to prioritize the handling of certain orders 42 in response to the occurrence of an appropriate triggering event. As a result, one or more the tasks associated the affected orders 42 may be completed more quickly and/or ahead of tasks related to other orders 42. For example, when management module 12 receives information indicating that a delivery truck has arrived, management module 12 may instruct the various components of inventory system 10 to prioritize tasks involving orders 42 to be delivered by that delivery truck.

In particular embodiments, management module 12 may instruct the various components to prioritize the relevant tasks by transmitting a priority message 64 to the affected components. Priority message 64 may represent any appropriate form of communication instructing the receiving component to adjust a priority level of a task to be completed by or otherwise associated with that component. For example, in particular embodiments, priority message 64 may represent a message communicated to a particular component instructing that component to reorder tasks in a queue maintained by that component. Alternatively, in particular embodiments, certain components of inventory system 10 may be configured to respond to their most recent task assignment 18 with later-received task assignments 18 overriding any previous task assignments 18. In such embodiments, priority message 64 may represent a task assignment 18 that cancels or supersedes a previous task assignment 18 received by the component.

As a result, inventory system 10 may be able to prioritize the picking tasks executed at inventory station 50 to create the affected orders 42, the processing tasks executed at processing stations 56 to prepare the affected orders 42 for shipping, and/or various other tasks completed within inventory system 10 involving the affected orders 42. This may allow inventory system 10 to limit wait times and make more efficient use of delivery resources and other system assets. This process is described in greater detail below with respect to FIG. 4.

Thus, overall, the described techniques for loading order holders 32 may allow users 14 to quickly and efficiently sort inventory items 40 into orders 42 ready for shipping. Additionally, by storing loaded order holders 32 in storage spaces 62, inventory system 10 may ensure that any delay between packing and shipping does not turn packed orders 42 into workspace obstacles. Furthermore, by filling order holders 32 with an intelligent mix of orders 42, inventory system 10 may also be able to optimize the use of storage space, workspace pathways, processing equipment, delivery resources, and other system assets in storing, processing, and shipping packed orders 42. As a result, certain embodiments of inventory system 10 may provide several operational benefits. Nonetheless, particular embodiments may provide some, none, or all of these benefits.

Additionally, the description above focuses on an embodiment of inventory system 10 in which particular inventory items 40 have been loaded into inventory holders 30 grouped by item type and then stored in inventory system 10 prior to the creation of any orders 42 that include these inventory items 40. In particular embodiments, however, inventory items 40 may not be stored in inventory system 10 prior to being used to fill orders 42 or may be stored in inventory holders 30 in arbitrary, ad hoc groupings. In such embodiments, management module 12 may be capable of managing the creation of orders from these unsorted groupings.

To illustrate, in particular embodiments, inventory system 10 may represent a processing facility for a shipping service and inventory items 40 may represent packages to be delivered by the shipping service. Packages may be stored in arbitrarily selected inventory holders 30 when they arrive or even piled near an inventory station 50. For example, an incoming delivery truck responsible for picking up packages from customers or branch offices may deliver a large number of packages to inventory system 10 that are stored on inventory holders 30, such as pallets, as they arrive. Management module 12 may then manage the process of sorting these packages for delivery to final destinations, branch offices, transportation hubs (e.g., airports), and/or other locations in their shipping chain. As a result, management module 12 may guide users 14 through the process of moving these packages from pallets brought to inventory station 50 or from stacks nearby inventory station 50 to an order holder 32 associated with a suitable final destination or next hop in the shipping chain of the relevant packages.

Figure 2:
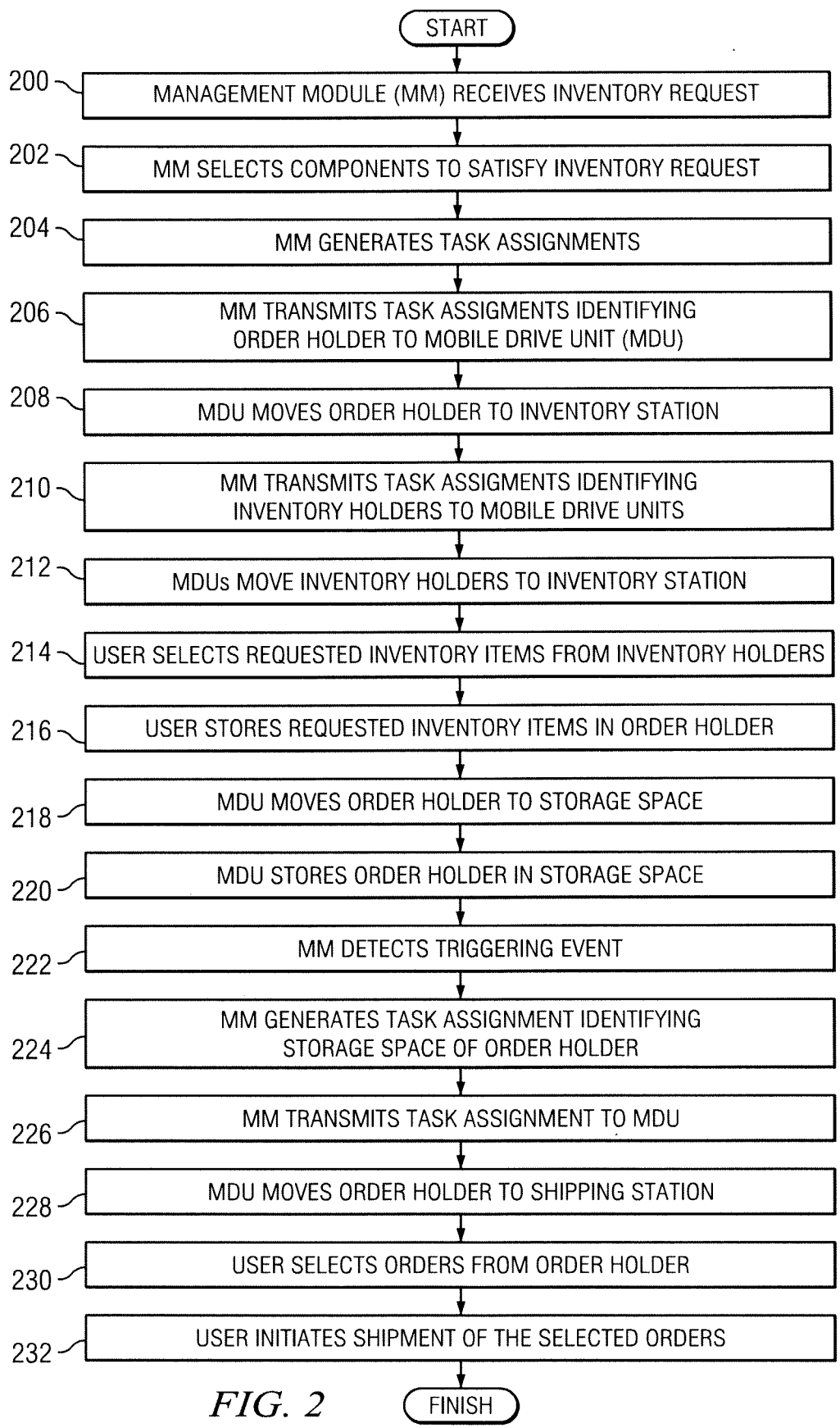
FIG. 2 is a flowchart detailing aspects of an example operation of a particular embodiment of the inventory handling system shown in FIG. 1.

FIG. 2 is a flowchart illustrating example operation of a particular embodiment of inventory system 10. Any of the steps illustrated in FIG. 2 may be combined, modified, or deleted where appropriate, and additional steps may also be added to the flowchart. Additionally, the steps may be performed in any suitable order without departing from the scope of the invention.

Operation begins, at step 200, with management module 12 receiving an inventory request 16 requesting an inventory item 40. The inventory request 16 specifies, describes, and/or otherwise indicates one or more requested inventory items 40 to be shipped out of inventory system 10. In response to inventory request 16, management module 12 selects a suitable collection of system components to satisfy inventory request 16 at step 202.

As part of selecting these components, management module 12 may select an order holder 32 on which to store an order 42 fulfilling inventory request 16. Management module 12 may use any appropriate considerations, criteria, and/or factors to select this order holder 32. For example, in particular embodiments, management module 12 may select an order holder 32 by identifying an order holder 32 currently storing orders 42 associated with a destination, shipping service, and/or delivery class indicated by the inventory request 16.

After selecting appropriate elements to complete the tasks, management module 12 generates one or more task assignments 18 describing the tasks to be completed at step 204. Management module 12 then transmits the generated task assignments 18 to one or more of the selected components. For example, at step 206, management module 12 may transmit task assignments 18 to a selected mobile drive unit 20 identifying the selected order holder 32. The selected mobile drive unit 20 may then move the order holder 32 to inventory station 50 at step 208. In particular embodiments, a mobile drive unit 20 will also move order holder 30 by positioning itself under a particular order holder 30 and docking with that inventory holder 30.

Additionally, at step 210, management module 12 may transmit task assignments 18 identifying selected inventory holders 30 to selected mobile drive units 20. In response to these task assignments 18, the selected mobile drive units 20 move the selected inventory holders 30 to inventory station 50 at step 212. In particular embodiments, mobile drive units 20 move inventory holders 30 by positioning themselves under a particular inventory holder 30 and docking with that inventory holder 30.

Once the appropriate inventory holders 30 and order holder 32 have been moved to inventory station 50, a user 14 selects one or more requested inventory items 40 from one or more of the selected inventory holders 30 at step 214. User 14 then stores the requested inventory items 40 in the selected order holder 32 at step 216. At step 218, a mobile drive unit 20 may move order holder 32 to a storage space 62. At step 220, inventory system 10 then stores the selected order holder 32 (and the order 42 created in steps 214-216) at the storage space 62 until an appropriate time.

At step 222, management module 12 detects a triggering event. As noted above, management module 12 may detect the triggering event by detecting the occurrence of a predetermined event and/or by receiving an indication that another component of inventory system 10 has detected the occurrence of a predetermined event. In response to detecting the triggering event, inventory system 10 retrieves order holder 32 from its storage space 62.

In particular embodiments, the order holder 32 may be retrieved by management module 12 generating a task assignment 18 identifying the storage space 62 of order holder 32 at step 224. Management module 12 then transmits the task assignment 18 to a mobile drive unit 20 at step 226. The relevant mobile drive unit 20 may then move order holder 32 to shipping station 52 at step 228.

At step 230, a user 14 operating shipping station 52 may select one or more orders 42 from order holder 32 for shipping. User 14 may then initiate the shipment of the selected order 42 at step 230. Operation of inventory system 10 with respect to fulfilling inventory request 16 may then end as illustrated in FIG. 2.

Figure 3:
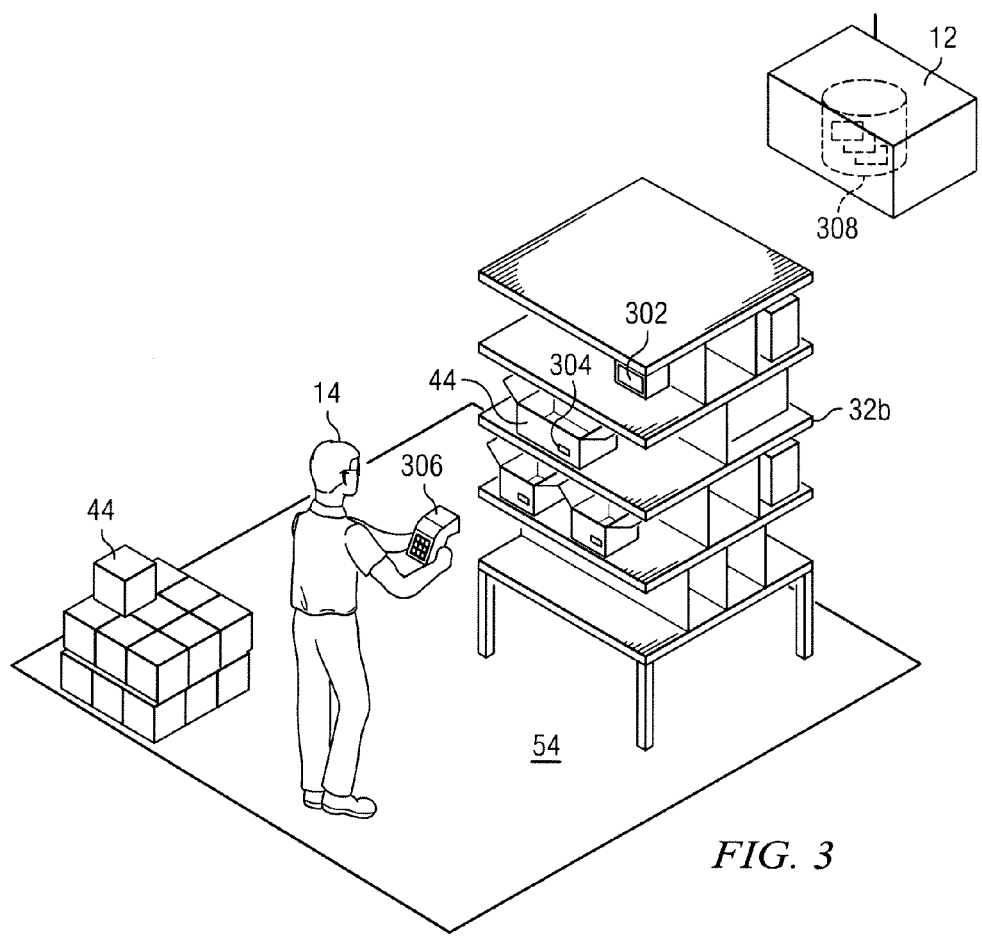
FIG. 3 illustrates a management module and an induction station that may be utilized in a particular embodiment of the inventory handling system.

FIG. 3 illustrates operation of an induction station 54 at which order holders 32 may be prepared for use. As noted above, particular embodiments of inventory system 10 may include one or more induction stations 54 at which order holders 32 are prepared for use in inventory system 10. As part of preparing order an order holder 32 (here order holder 32b) for use, a user 14, in particular embodiments, may load the relevant order holder 32b with shipping containers 44. Shipping containers 44 may represent any appropriate containers for shipping orders 42.

In addition, in particular embodiments, order holder 32b and shipping containers 44 each include or are attached to an identifier that uniquely identifies the relevant component. For example, order holder 32b may bear a holder identifier 302 that uniquely identifies the order holder 32b, while each shipping container 44 bears a container identifier 304 that uniquely identifies the shipping container 44 to which it is attached. Holder identifier 302 and container identifiers 304 may represent bar codes, radio-frequency identifier (RFID) tags, or any other appropriate elements that can actively or passively provide information uniquely identifying the component to which the identifiers 302 and 304 are attached.

Furthermore, induction station 54 may include one or more identifier readers 306 capable of reading, detecting, or receiving information provided by holder identifiers 302 and container identifiers 304 and communicating this information to, for example, management module 12. Identifier reader 306 may represent or include a bar code scanner, an RF receiver, or any other appropriate combination of hardware and/or software suitable to receive information from identifiers used in inventory systems 10 and communicating this information to appropriate components of inventory system 10. As a result, while preparing order holder 32b for use, user 14 may read holder identifier 302 of order holder 32b using identifier reader 306 and communicate information identifying holder identifier 302 to management module 12. User 14 may additionally use identifier reader 306 to read container identifiers 304 of each of the shipping containers 44 stored in order holder 32b and communicate information identifying each shipping container 44 to management module 12.

Management module 12 may then store information identifying order holder 32b and the shipping containers 44 stored by order holder 32b in a database 308 maintained by management module 12. This information may include an association between order holder 32b and each of the shipping containers 44 stored in order holder 32b. As the status of order holder 32b and shipping containers 44 changes during the operation of inventory system 10, management module 12 may add to or update the information included in database 308. In particular embodiments, database 308 may store the location of order holders 32 in inventory system 10 and the orders 42 and/or shipping containers 44 stored by those order holders 32. Furthermore, management module 12 may use the information stored in database 308 to determine appropriate tasks to complete or the appropriate components to utilize in completing those tasks. Overall, database 308 may include any suitable information to be used by management module 12 during operation.

As one example, when management module 12 receives an inventory request 16 to be delivered to a particular destination or to be delivered by a particular delivery service, management module 12 may utilize information stored in database 308 to select an order holder 32 that currently stores one or more orders 42 to be delivered to the same destination or by the same delivery service. Management module 12 may then also use information in database 308 (e.g., the current location of the selected order holder 32) in generating a task assignment 18 to facilitate transportation of the selected order holder 32 to an appropriate inventory station 50. Additionally, management module 12 may update a record for the relevant order holder 32 and/or the relevant shipping container 44 to reflect the fact that an order 42 satisfying the received inventory request 16 is now stored in that order holder 32 or shipping container 44.

As another example, when management module 12 receives information indicating that a delivery truck bound for a particular destination has arrived, management module 12 may access database 308 to identify one or more orders 42 bound for that destination and the order holders 32 currently storing those orders 42. Management module 12 may then generate task assignments 18 directing mobile drive units 20 to each of these order holders for purposes of transporting these order holders 32 to an appropriate shipping station 52. Additionally, management module 12 may generate one or more task assignments 18 identifying the orders 42 to be loaded on to the delivery truck and transmit these task assignments 18 to the relevant shipping station 52 and/or a user 14 operating that shipping station 52. The user 14 can then use these task assignments to select, from the order holders 32 brought to shipping station 52, orders 42 to be delivered to the designated destination and load these orders 42 on the delivery truck. As a result, in particular embodiments, information maintained in database 308 may allow management module 12 to more efficiently manage the operation of inventory system 10.

Figure 4:
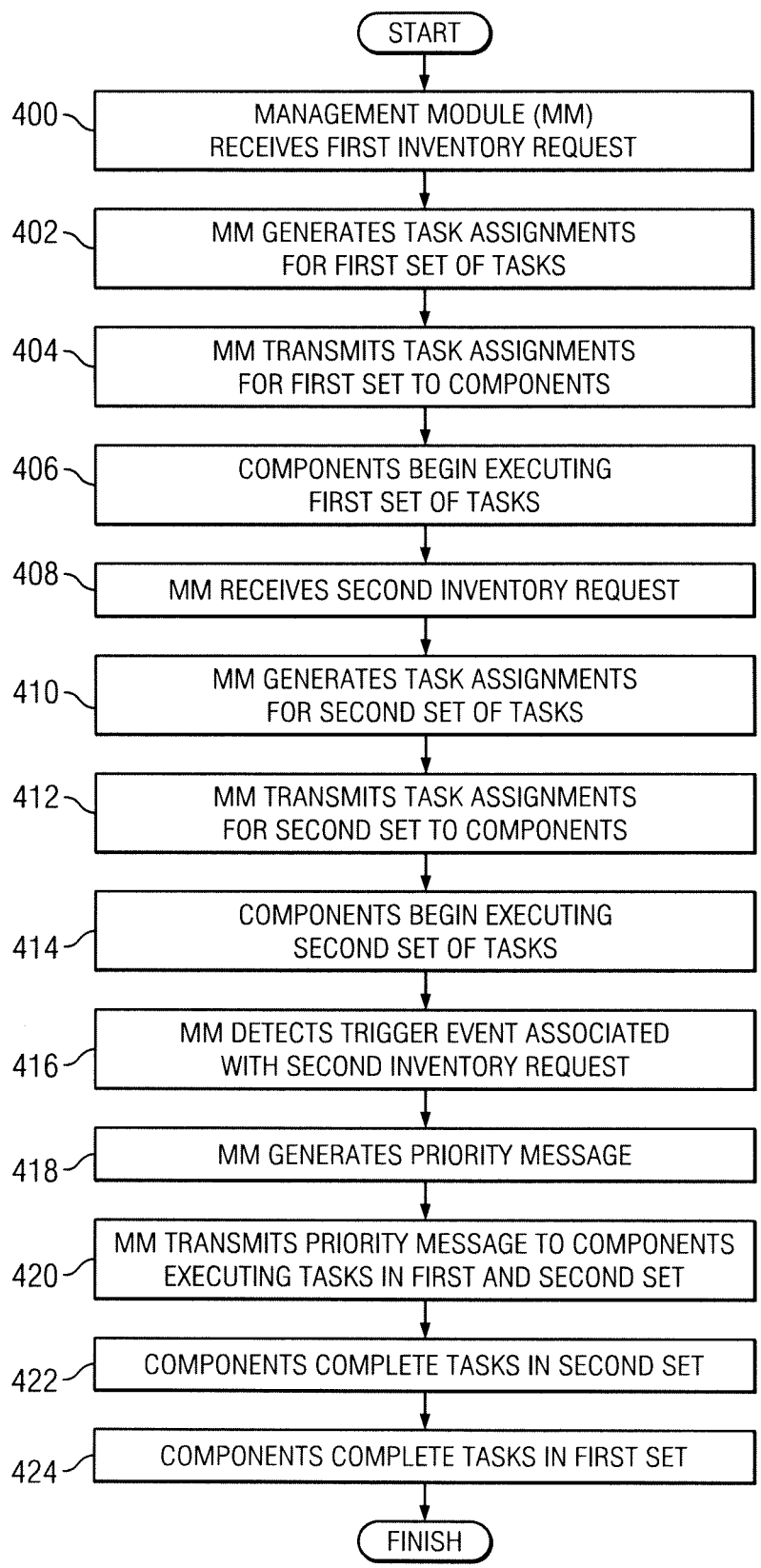
FIG. 4 is a flowchart detailing additional aspect of an example operation of a particular embodiment of the inventory handling system shown in FIG. 1.

FIG. 4 is a flowchart illustrating example operation of a particular embodiment of inventory system 10. More specifically, FIG. 4 illustrates operation of inventory system 10 in detecting a triggering event associated with particular inventory requests 16 received by inventory system 10 and prioritizing the handling of those inventory requests 16. Any of the steps illustrated in FIG. 4 may be combined, modified, or deleted where appropriate, and additional steps may also be added to the flowchart. Additionally, the steps may be performed in any suitable order without departing from the scope of the invention.

Operation begins in the example at step 400 with management module 12 receiving a first inventory request 16 that requests one or more inventory items 40. At step 402, management module 12 generates task assignments 18 for a first set of one or more tasks. This first set of tasks is to be completed by various components of inventory system 10 as part of filling the first inventory request 16. At step 404, management module 12 transmits the task assignments 18 for the first set of tasks to the appropriate components of inventory system 10. As discussed above, these task assignments 18 may relate to grouping inventory items 40 to create orders 42, preparing orders 42 for shipment, transporting orders 42 between various locations within inventory system 10, and/or shipping orders 42 or delivering orders 42 to shipping services. At step 406, the components receiving task assignments 18 associated with the first set of tasks begin executing the first set of tasks.

As one example, in particular embodiments, the first set of tasks may include one or more tasks relating to picking inventory items 40 from inventory holders 30 for purposes of creating orders 42. In particular, each task may involve moving one or more units of a particular inventory item 40 from an inventory holder 30 that stores the relevant inventory item 40 to an order holder 30 and/or shipping container 44 associated with the first inventory request 16. As another example, in particular embodiments, the first set of tasks may include one or more tasks relating to processing an order 42 after the inventory items 40 associated with that order 42 have been placed in a corresponding order holder 32 and/or shipping container 44. Such tasks may involve filling shipping containers 44 with packaging materials, taping shipping containers 44, applying shipping labels, performing quality control checks, logging orders 42, and/or any other aspect of preparing orders 42 for shipment. As yet another example, the first set of tasks may include one or more tasks relating to the transport of order holders 42 and/or shipping containers 44 to a shipping station 52. In general, however, the tasks in the first set of tasks may relate to any aspect of creating a first order 42 responding to the first inventory request 16, preparing the first order 42 for shipment, transporting the first order 42, shipping the first order 42 to an intermediate or final destination, and/or any other appropriate aspect of filling first order 42.

At step 408 management module 12 receives a second inventory request 16 that requests one or more inventory items 40. At step 410, management module 12 generates task assignments for a second set of one or more tasks. This second set of tasks is to be completed by various components of inventory system 10 as part of filling the second inventory request 16. At step 412, management module 12 transmits the task assignments for the second set of tasks to components of inventory system 10. Similar to the first set of tasks, the second set of tasks may relate to any aspect of creating a second order 42 responding to the second inventory request 42, preparing the second order 42 for shipment, transporting the second order 42 between various locations within inventory system 10, and/or shipping the second order 42 to an intermediate or final destination. At step 414, the components receiving task assignments 18 associated with the second set of tasks begin executing the second set of tasks.

At step 416, management module 12 detects a trigger event associated with the second inventory request 16. As noted above with respect to FIG. 1, the trigger event may comprise any appropriate event that initiates the shipment of particular orders 42, makes the shipping of particular orders 42 possible, defines a time or schedule for the shipping of particular orders 42, and/or otherwise affects the timing of order shipments. For example, in particular embodiments, the trigger event detected by management module 12 may be the arrival of a transportation vehicle intended to deliver the second order 42.

Additionally, in particular embodiments, inventory system 10 may be informed when a particular condition for shipping orders 42 will soon be satisfied. For example, inventory system 10 may be informed when a transportation vehicle has been dispatched by a shipping service to serve inventory system 10 or when the arrival of a transportation vehicle is imminent. Thus, in particular embodiments, management module 12 may detect the trigger event by detecting the receipt of information indicating that a condition for shipping will soon be satisfied.

Furthermore, in particular embodiments, management module 12 may maintain a schedule for determining when certain conditions for shipping particular orders 42 will be satisfied. For example, management module 12 may maintain a schedule indicating when a particular shipping service will pick up outgoing packages from inventory system 10. Inventory system 10 may then, as one example, be configured to expedite or otherwise adjust the processing of orders 42 that are affected by the conditions in the schedule, either at the scheduled time or during a predetermined period before the scheduled time. Thus, in particular embodiments, management module 12 may detect the trigger event by determining that the current time matches the scheduled time at which a particular condition was to be satisfied. For example, management module may detect the trigger event by determining that the current time matches a scheduled pickup time for a particular shipping service. Alternatively, management module 12 may detect the trigger event by determining that the current time is within a predetermined range of the scheduled time at which a particular condition is to be satisfied. For example, management module 12 may detect the trigger event by determining that the current time is less than fifteen minutes from the scheduled pickup time.

After management module 12 detects the trigger event associated with tasks in the second set, management module 12 prioritizes one or more of the tasks in the second set. Management module 12 may prioritize the relevant tasks in any appropriate manner depending on the capabilities and configuration of inventory system 10 and any of its components. For example, as shown at steps 418-422 in FIG. 4, management module 12 may, in particular embodiments, generate a priority message 64 and transmit priority message 64 to one or more of the components executing the first and second set of tasks.

As noted above, priority messages 64 may each represent any appropriate form of communication instructing the receiving component to adjust a priority level of a task to be completed by or otherwise associated with that component. One or more of the components of inventory system 10 may respond to the priority message 64 by completing (or facilitating completion of) a task in the second set prior to completing (or facilitating completion of) a task in the first set that would otherwise have been completed before the relevant task in the second set.

More specifically, as shown at step 420, the various components of inventory system 10 complete the tasks in the second set and then, at step 422, the various components of inventory system 10 complete the tasks in the first set. Thus, as a result of the prioritization by management module 12, one or more tasks of the second order 42 are completed prior to one or more tasks of the first order 42. While the first set of tasks may as a whole be completed before the second set, in particular embodiments, at least one of the tasks in the second set is completed before at least one task in the first set that would otherwise have been completed prior to the relevant task in the second set. Operation of inventory system 10 may then end with respect to filling the first and second inventory requests 16.

As one example of how prioritization may occur, in particular embodiments, management module 12 may transmit a first task assignment to a mobile drive unit 20 instructing that mobile drive unit 20 to move a first order holder 32 to inventory station 50. After detecting a trigger event, management module 12 may, as part of step 418, transmit a priority message 64 (such as an additional task assignment 18) to that mobile drive unit 20 instructing mobile drive unit 20 to instead move a second order holder 32 to inventory station 50. As a result of receiving the second task assignment 18, the relevant mobile drive unit 20 may abort the transport of the first order holder 32 and instead initiate transport of the second order holder 32 to inventory station 50.

As another example, in particular embodiments, management module 12 may transmit a first task assignment 18 to inventory station 50 that identifies inventory items 40 requested by the first inventory request 16. Management module 12 may also transmit a second task assignment 18 to inventory station 50 indicating inventory items 40 requested by the second inventory request 16. A computer screen or other form of display at inventory station 50 may display to a user 14 an ordered queue indicating inventory items 40 to be included in the various orders 42 being created at inventory station 50. User 14 may, based on this display, pick inventory items 40 to include in the first and second orders 42. After detecting a trigger event, management module 12 may transmit a priority message 64 to inventory station 50, as part of step 418, instructing the computer to display, in the ordered queue, the inventory items 40 for the second order 42 ahead of the inventory items 40 for the first order 42 or to otherwise induce user 14 to create the second order 42 prior to completing first order 42.

Thus, management module 12 may, by adjusting the priority of tasks completed in inventory system 10, influence the order in which orders 42 are filled. As a result, in particular embodiments, management module 12 may optimize use of delivery assets and other resources available in inventory system 10. Consequently, management module 12 may provide operational benefits in particular embodiments. Nonetheless, particular embodiments may include all, some, or none of the enumerated advantages.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A system for fulfilling inventory requests, comprising:
a plurality of inventory holders operable to store inventory items;
an order holder operable to store orders, wherein each order comprises one or more inventory items and is associated with a particular inventory request;
a plurality of mobile drive units operable to move the inventory holders and order holder within a workspace;
a management module operable to:
receive an inventory request requesting an inventory item;
instruct any one of the plurality of mobile drive units to move an inventory holder storing the requested inventory item to a first location;
instruct any one of the plurality of mobile drive units to move the order holder to the first location, wherein the requested inventory item is transferred from the inventory holder to the order holder at the first location;
instruct any one of the plurality of mobile drive units to move the order holder to a storage space within the workspace;
detect a triggering event; and
in response to detecting a triggering event, transmit a priority message to any one of the plurality of mobile drive units instructing it to adjust a priority level of a task assignment, wherein the mobile drive unit which received the transmitted priority message, in response to receiving the priority message, retrieves the order holder from the storage space.

2. The system of claim 1, wherein the management module is operable to receive an order requesting an inventory item by receiving an order requesting a plurality of inventory items.

3. The system of claim 2, wherein the management module is operable to instruct any one of the plurality of mobile drive units to move an inventory holder storing the requested inventory item to a first location by instructing a plurality of mobile drive units to move a plurality of inventory holders to the first location, wherein each of the plurality of inventory holders stores one or more of the requested inventory items.

4. The system of claim 1, wherein the management module is operable to instruct any one of the plurality of mobile drive units to move the inventory holder to the first location by instructing it to:
move to the inventory holder;
dock with the inventory holder; and
move the inventory holder to the first location.

5. The system of claim 1, wherein each of the order holders holds a plurality of shipping containers operable to hold inventory items during shipping, and wherein the management module is operable to:
identify a shipping container in which the requested inventory item should be stored; and
instruct any one of the plurality of mobile drive units to move the order holder by instructing it to move the order holder to a storage space after the requested inventory item has been transferred from the inventory holder to a particular shipping container.

6. The system of claim 1, wherein the management module is operable to instruct any one of the plurality of mobile drive units to move the order holder to the first location by:
identifying an order holder currently storing orders associated with a destination indicated by the inventory request; and
instructing any one of the plurality of mobile drive units to move the identified order holder to the first location.

7. The system of claim 1, wherein the storage space comprises one or more storage spaces and the management module is further operable to arrange the one or more storage spaces according to a shipping sequence.

8. An apparatus for fulfilling inventory request, comprising:
a memory operable to store processor instructions; and
a processor operable, when executing the processor instructions, to receive an inventory request requesting an inventory item;
instruct any one of a plurality of mobile drive units to move an inventory holder storing the requested inventory item to a first location;
instruct any one of the plurality of mobile drive units to move the order holder to the first location, wherein the requested inventory item is transferred from the inventory holder to the order holder;
instruct any one of the plurality of mobile drive units to move the order holder to a storage space within the workspace after the requested inventory item has been transferred from the inventory holder to the order holder;
detect a triggering event; and
in response to detecting a triggering event, transmit a priority message to any one of the plurality of mobile drive units instructing it to adjust a priority level of a task assignment, wherein the mobile drive unit which received the transmitted priority message, in response to receiving the priority message, retrieves the order holder from the storage space.

9. The apparatus of claim 8, wherein the storage space comprises one or more storage spaces and the management module is further operable to arrange the one or more storage spaces according to a shipping sequence.

10. The apparatus of claim 8, wherein the management module is operable to instruct any one of the plurality of mobile drive units to move the inventory holder to the first location by instructing it to:
move to the inventory holder;
dock with the inventory holder; and
move the inventory holder to the first location.

11. The apparatus of claim 8, wherein each of the order holders holds a plurality of shipping containers operable to hold inventory items during shipping, and wherein the management module is operable to:
identify a shipping container in which the requested inventory item should be stored; and
instruct any one of the plurality of mobile drive units to move the order holder by instructing it to move the order holder to a storage space after the requested inventory item has been transferred from the inventory holder to a particular shipping container.

12. The apparatus of claim 8, wherein the management module is operable to instruct any one of the plurality of mobile drive units to move the order holder to the first location by:
identifying an order holder currently storing orders associated with a destination indicated by the inventory request; and
instructing any one of the plurality of mobile drive units to move the identified order holder to the first location.

13. A computer program stored on a non-transitory computer readable medium, the computer program operable when executed to:
receive an inventory request requesting an inventory item;
instruct a user to select the requested inventory item from an inventory holder;

instruct the user to store the requested inventory item in an order holder associated with the inventory request;

instruct any one of a plurality of mobile drive units to move the order holder to a storage space;

detect a triggering event; and in response to detecting a triggering event, transmit a priority message to any one of the plurality of mobile drive units mobile drive unit instructing it to adjust a priority level of a task assignment, wherein the mobile drive unit which received the transmitted priority message, in response to receiving the priority message, retrieves the order holder from the storage space.

14. The computer program of claim 13, wherein the storage space comprises one or more storage spaces and the management module is further operable to arrange the one or more storage spaces according to a shipping sequence.

15. The computer program of claim 13, wherein the management module is operable to instruct any one of the plurality of mobile drive units to move the inventory holder to the first location by instructing it to:

move to the inventory holder;

dock with the inventory holder; and move the inventory holder to the first location.

16. The computer program of claim 13, wherein each of the order holders holds a plurality of shipping containers operable to hold inventory items during shipping, and wherein the management module is operable to:

identify a shipping container in which the requested inventory item should be stored; and instruct any one of the plurality of mobile drive units to move the order holder by instructing it to move the order holder to a storage space after the requested inventory item has been transferred from the inventory holder to a particular shipping container.

17. The computer program of claim 13, wherein the management module is operable to instruct any one of the plurality of mobile drive units to move the order holder to the first location by:

identifying an order holder currently storing orders associated with a destination indicated by the inventory request; and instructing any one of the plurality of mobile drive units to move the identified order holder to the first location.

* * * * *